(12) United States Patent
Tschetschorke

(10) Patent No.: US 6,672,763 B1
(45) Date of Patent: Jan. 6, 2004

(54) COMPENSATING BEARING

(75) Inventor: Peter Tschetschorke, Halle (DE)

(73) Assignee: INA-Schaeffler KG, Herzogenaurach (DE)

( * ) Notice: Subject to any disclaimer, the term of this patent is extended or adjusted under 35 U.S.C. 154(b) by 0 days.

(21) Appl. No.: 09/831,060

(22) PCT Filed: Oct. 26, 1999

(86) PCT No.: PCT/EP99/08093
§ 371 (c)(1),
(2), (4) Date: Aug. 24, 2001

(87) PCT Pub. No.: WO00/28145
PCT Pub. Date: May 18, 2000

(30) Foreign Application Priority Data

Nov. 5, 1998 (DE) ................... 198 50 946

(51) Int. Cl.[7] ............... F16C 17/00; F16C 33/00
(52) U.S. Cl. ............................. 384/9; 384/41
(58) Field of Search .................. 384/9, 7, 38, 41, 384/42

(56) References Cited

U.S. PATENT DOCUMENTS

| | | | | |
|---|---|---|---|---|
| 3,893,732 A | * | 7/1975 | McCloskey | 384/43 |
| 4,264,112 A | | 4/1981 | Magnuson | 384/29 |
| 4,372,223 A | * | 2/1983 | Iwatani | 108/143 |
| 4,462,955 A | | 7/1984 | Albin et al. | 376/272 |
| 4,609,264 A | * | 9/1986 | Podvin et al. | 108/137 |
| 4,637,738 A | | 1/1987 | Barkley | 384/38 |
| 4,995,734 A | * | 2/1991 | Schroeder | 384/29 |
| 5,033,869 A | * | 7/1991 | Kingston et al. | 384/13 |
| 5,312,053 A | | 5/1994 | Ganser, IV | 241/213 |
| 5,329,825 A | * | 7/1994 | Askins | 108/143 |
| 5,341,700 A | * | 8/1994 | Speranza et al. | 108/143 |
| 5,366,297 A | * | 11/1994 | Wolverton et al. | 384/49 |
| 5,374,125 A | * | 12/1994 | McMurtry et al. | 384/12 |
| 6,132,091 A | * | 10/2000 | Lee et al. | 108/137 |
| 6,309,106 B1 | * | 10/2001 | Hooley | 384/37 |

FOREIGN PATENT DOCUMENTS

| | | |
|---|---|---|
| DE | 826597 | 1/1952 |
| DE | 1459949 | 1/1970 |
| DE | 3412362 C1 * | 10/1985 |
| DE | 3603352 A1 | 8/1986 |

OTHER PUBLICATIONS

"Innovationen in Stahl", No. AG 01 D–3000–12.97 of the Maurer Sohne Company.*

Obuch, Hans–Joachim: Formstabil und wartungsarm. In: Lager und Linear Fuhrungen, 1993, p. 122.

* cited by examiner

Primary Examiner—Jack Lavinder
Assistant Examiner—Melody M. Burch
(74) Attorney, Agent, or Firm—Volpe and Koenig, P.C.

(57) ABSTRACT

A bridge bearing in which a substructure and a superstructure are displaceably connected to each other by means of a sliding bearing, whereby the displacement occurs in a linear and/or cardanic manner in at least one of the directions X, Y, and Z. The bearing is characterized in that a carriage (7) that is connected to a cover plate (10) is guided in a linear manner in the X and/or Y direction by two interspaced shafts (5, 4), respectively, on which displaceable slide bushings (9, 8) are arranged and/or the cover plate can be guided in a tiltable manner by a pivot bearing (18) in the Z direction. This combination of a linear and pivot bearing enables all alignment errors arising as a result of finishing inaccuracies, foundation subsidence, desired and undesirable slanting to be compensated and regulates the variations in lengths due to temperature and load.

8 Claims, 10 Drawing Sheets

COMPENSATING BEARING

AREA OF THE INVENTION

Figure 1:
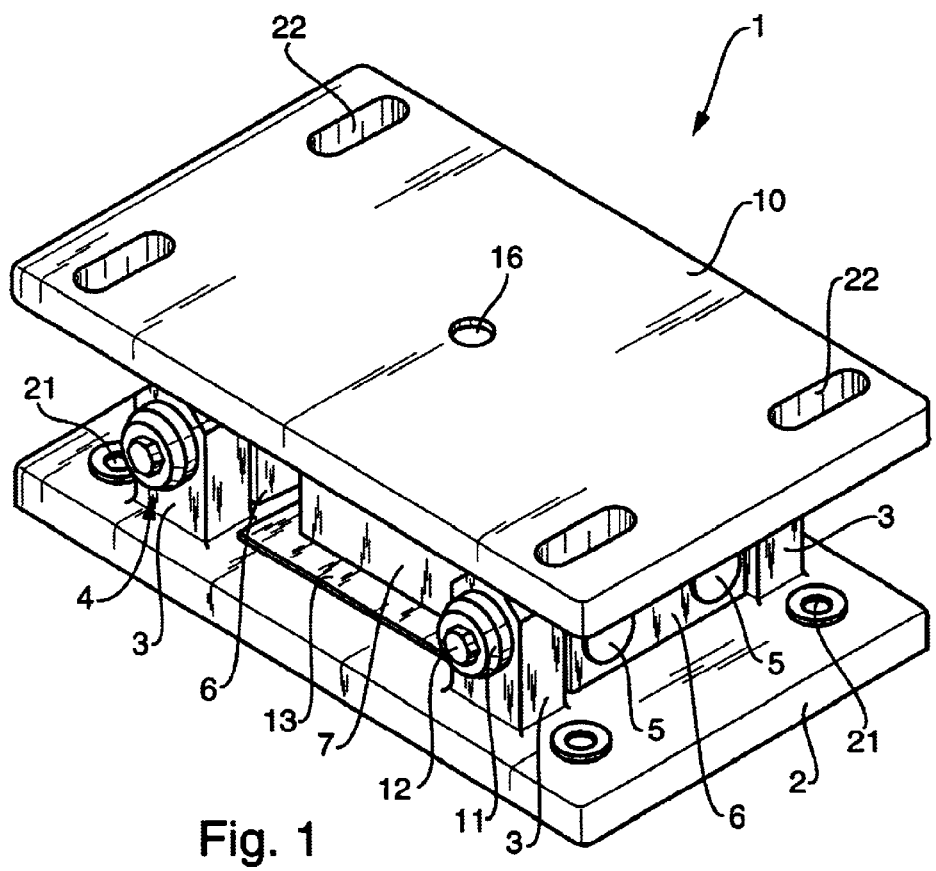

The invention relates to a compensating bearing, for example, a bridge bearing or a travel way bearing, in which a substructure and a superstructure are displaceably connected to each other by means of a sliding bearing, whereby the displacement occurs in a linear and/or cardanic manner in at least one of the directions X, Y, and Z in a hypothetical three-dimensional coordinate system.

BACKGROUND

Compensating bearings of this type, which for their part rest on abutments or piers, transfer the load from the superstructure to the substructure, whereby the superstructure moves in the longitudinal and/or transverse direction. In order to receive twisting angles, bearings of this type must, however, also be combined with a pivoting part.

A bridge bearing of this type according to the generic concept is known from the pamphlet "Innovation in Steel", No. AG 01 D-3000-12.97 of the Maurer Söhne Company. It consists of a base plate, on which an intermediate plate that can be moved in the X-direction is arranged, which in turn carries a second intermediate plate that can be moved in the Y direction. This second intermediate plate has a curved recess, in which a complementary spherical section is placed. This bridge bearing according to the generic concept is then closed by a cover plate, which can perform linear movements in the direction of the two axes X, and Y, and can pivot around the Z axis.

A bridge bearing of this type has, on the one hand, relatively large dimensions and on the other hand, is relatively imprecise in its adjustability with regard to the X, Y, and Z axes. An additional disadvantage is in its insufficient freedom of play.

SUMMARY

The objective of the invention is thus to develop an improved compensating bearing while avoiding the previous disadvantages.

According to the invention, this objective is achieved by providing a carriage that is connected to a cover plate that is guided linearly in the X- and/or Y-direction respectively via two shafts that are set apart at distances from each other, on which slide bushings that can be moved are arranged and/or that the cover plate is guided so that it can be tilted in the Z-direction via a first pivot bearing.

The decisive advantage of this bearing is its clear differentiation with regard to the function of the three movement axes. The slide bushings ensure an absolute maintenance freedom at the lowest level of friction. Bearing elements that are adjusted to the load, such as slide bearings and pivot bearings, reduce the total weight of the bearing construction and require little construction space. The round and/or spherical bearing elements are self-centering, which makes possible a high precision and a good side stability. The combination according to the invention, made of linear bearings and plain bearings, enables all alignment errors arising as a result of finishing inaccuracies, foundation subsidence, desired and undesirable slanting to be compensated and regulates the variations in lengths due to temperature and load by having a good damping capacity.

An especially advantageous compensation bearing, which makes possible the reception of forces from all three movement directions, is also provided. This X-, Y-, and Z-bearing is characterized in that a base plate has four projecting shaft holders that are set apart from each other in the X-direction and in the Y-direction, and in which two Y-shafts are held, on each of the Y-shafts, an additional shaft holder is arranged so that it can be moved, which are connected to each other by two X-shafts, so that the carriage guided on the X and Y shafts via the sliding bushings can be moved linearly in both directions, and that the carriage has a curved shaft disc that is received in an associated recess of the cover plate so that the cover plate can be tilted in the Z-direction.

According to another characteristic of the invention, it is provided that the slide bushings are maintenance-free cylindrical slide bushings based on PTFE.

These dry slide bearings that are known to persons skilled in the art include cylindrical steel supporting structures and the maintenance-free slide layer. The steel structure protects against damages in the handling and during installation. The slide layer is generally formed of a 0.5 mm strong PTFE fabric, generally embedded in artificial resin and affixed in a high-strength manner to the support structure. The flow behavior of the slide layer is almost negligible in the connection with the support structure even for high loads. The adhesive connection is moisture-stable and does not swell.

In another aspect, it is apparent that the Y-shafts are affixed in the shaft holders using mounting caps, which are pressed from the outside against the shaft holder with a mounting bolt that is arranged in the facing ends of the Y-shafts. In this way, a simple and secure attachment of the Y-shafts results.

According to an additional characteristic of the invention, it is provided that the X-shafts each have a curved recess on the opposite ends, into which the Y-shafts are inserted with a part of their circumferential surface. This has the advantage that by the recess, the bearing attachment of the X-shafts is done in an elegant manner through the Y-shafts.

An especially advantageous form of the bearing according to the invention, provides that the base plate has in its middle part a supporting projection that projects in the direction of the cover plate and is contacted by the lower side of the carriage in the unloaded condition.

This has the advantage that the introduction of force on the bearing does not occur via the X- and the Y-shafts, but directly on the base plate, so that an entirely especially stable embodiment of the bearing results.

In another aspect, the X and/or Y shafts should have a deflection in the direction of the cover plate. This makes it so that shafts equipped in this manner have a certain spring action so that the bearing is pretensioned.

An additional, especially advantageous embodiment of the invention, provides that the carriage include in its middle part a hole going through that is provided with a shoulder. A second pivot bearing is set into the hole and is held via a mounting bolt that is inserted into the cover plate, whereby in the area of a journal of the carriage, a gap is formed between the mounting bolt and the through-hole. In this process it is advantageous that upon a change of the forces into the negative range, the Z-axis can not lift off of the cover plate, i.e. a securing against lift-off is formed. In this case, it is necessary that both pivot bearings have a common spherical center.

In another aspect, the pivot bearings can be constructed as maintenance-free axial plain bearings, radial plain bearings, or inclined plain bearings based on PTFE. These pivot bearings are pre-assembled units, which include shaft discs and housing discs and maintenance-free slide layers in the housing discs. The shaft disc has a spherical outer sliding path, while the housing disc is provided with a hollow-spherical inner sliding path and with an adhered slide layer. Pivot bearings of this type are then used if, for example, high loads are transferred with slight movements.

An additional advantageous embodiment form of an X-Z-bearing is described, in which a base plate has two projecting shaft holders that are set apart from each other in the X-direction in which two X-shafts set apart from each other are held. Slide bushings that can be moved in a linear direction that are connected with the carriage are arranged on the X-shafts, and the carriage has a curved shaft disc that is received in a corresponding recess of the cover plate so that it can be tilted in the Z-direction.

The associated opposing piece, namely a Y- Z-bearing, is also provided in which a base plate should have two projecting shaft holders that are set apart from each other in the Y-direction in which two Y-shafts that are set apart from each other are held, on which slide bushings are arranged on the two Y-shafts that can be moved in a linear direction and are connected with the carriage, and the carriage, has a curved shaft disc that is received in a corresponding recess of the cover plate so that it can be tilted in the Z-direction.

Finally, a Z-bearing is described, i.e. a bearing with only one degree of freedom. Bearings of this type are used especially as so-called fixed bearings. It is characterized in that the base plate is provided with a projection that projects in the direction of the cover plate, which is provided on its upper end with a circular-ring shaped curved shaft disc, which is included in a corresponding recess of the cover plate so that it can be tilted in the Z-direction.

BRIEF DESCRIPTION OF THE DRAWING(S)

The invention is explained in greater detail on the basis of the preferred embodiment in connection with the attached drawings.

Figure 2:
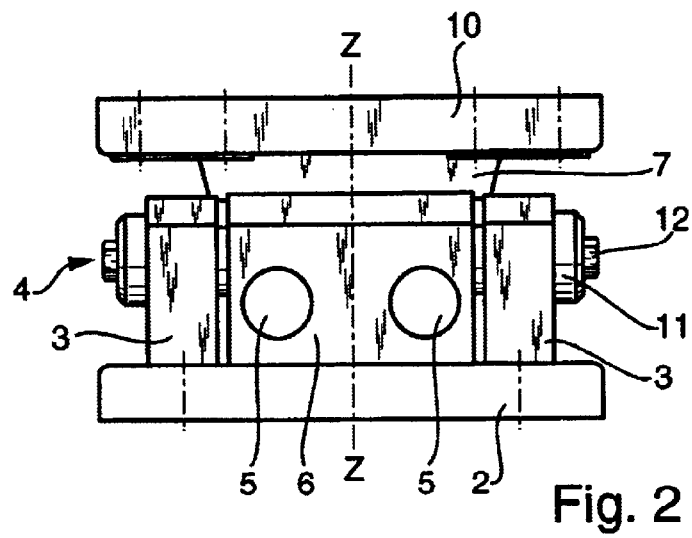
Figure 3:
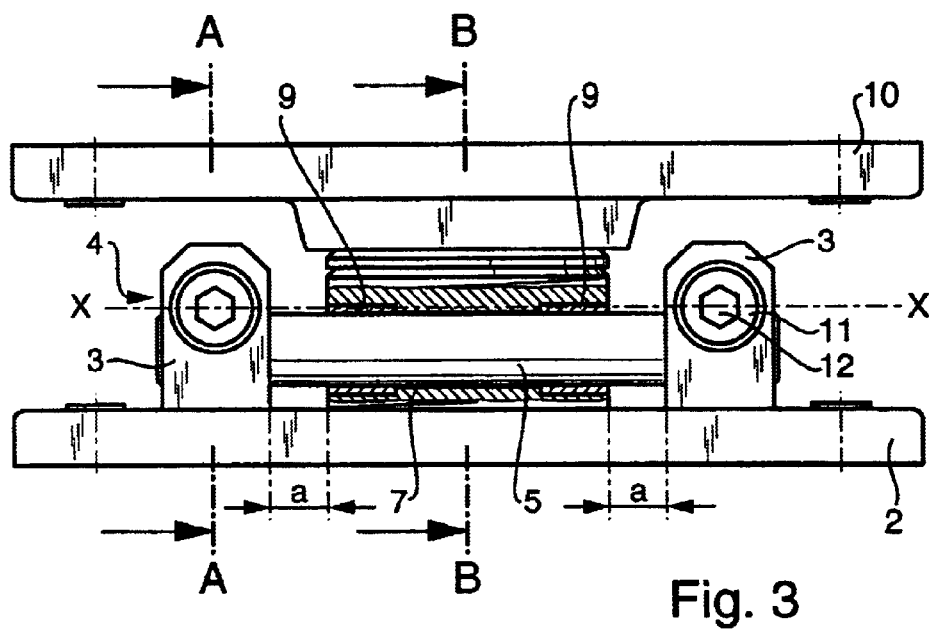
Figure 4:
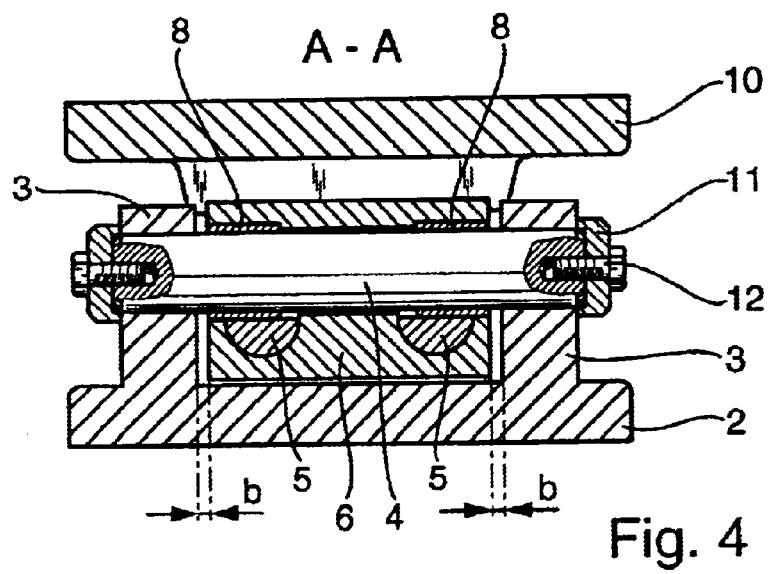
Figure 5:
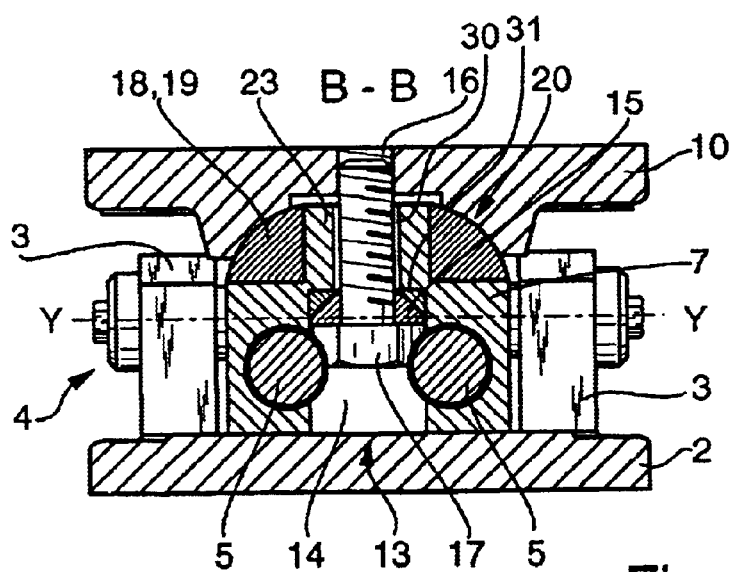
Figure 6:
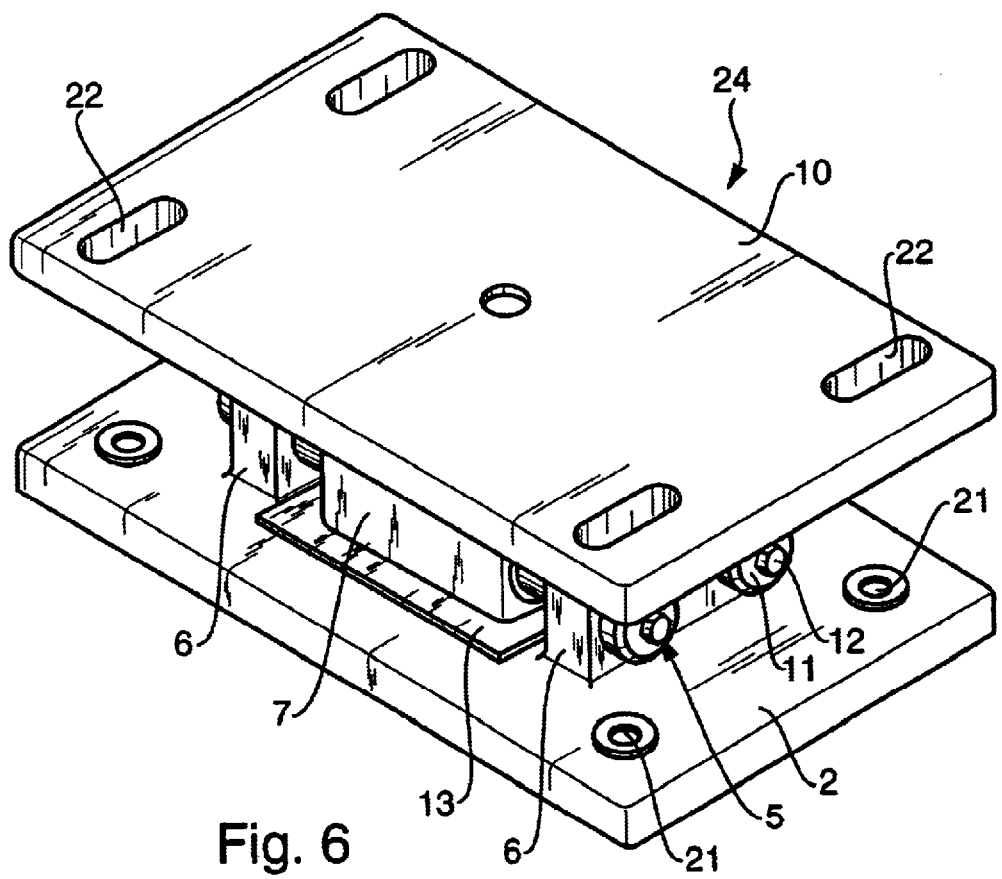
Figure 7:
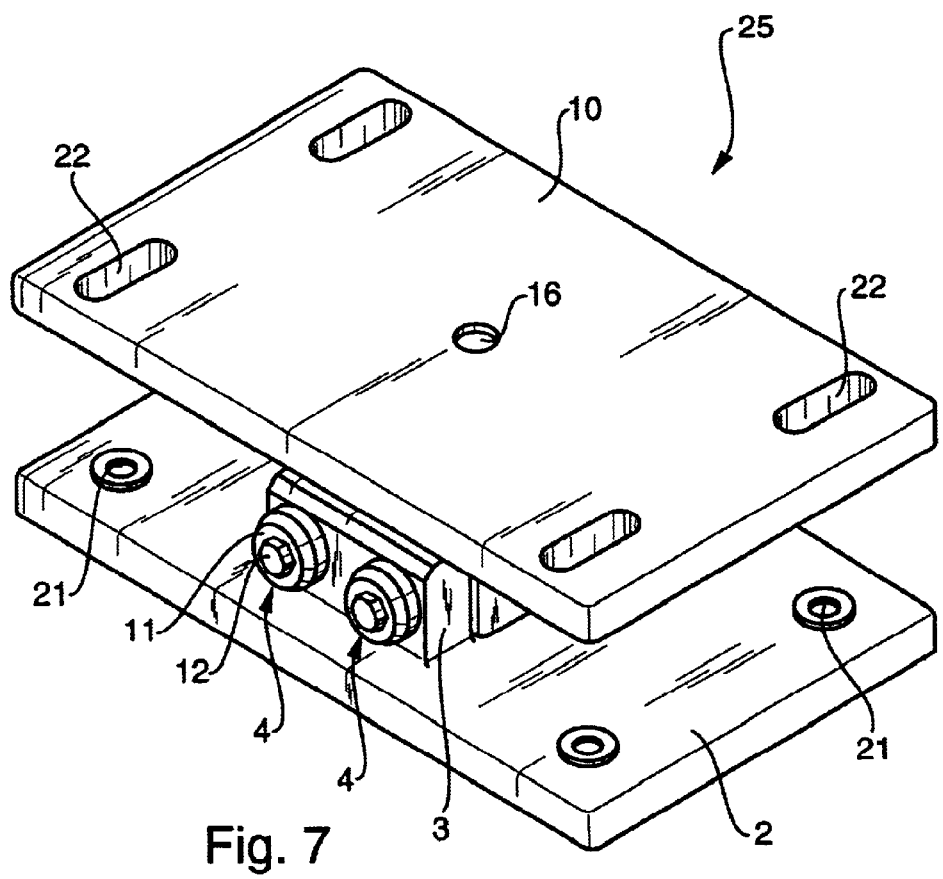
Figure 8:
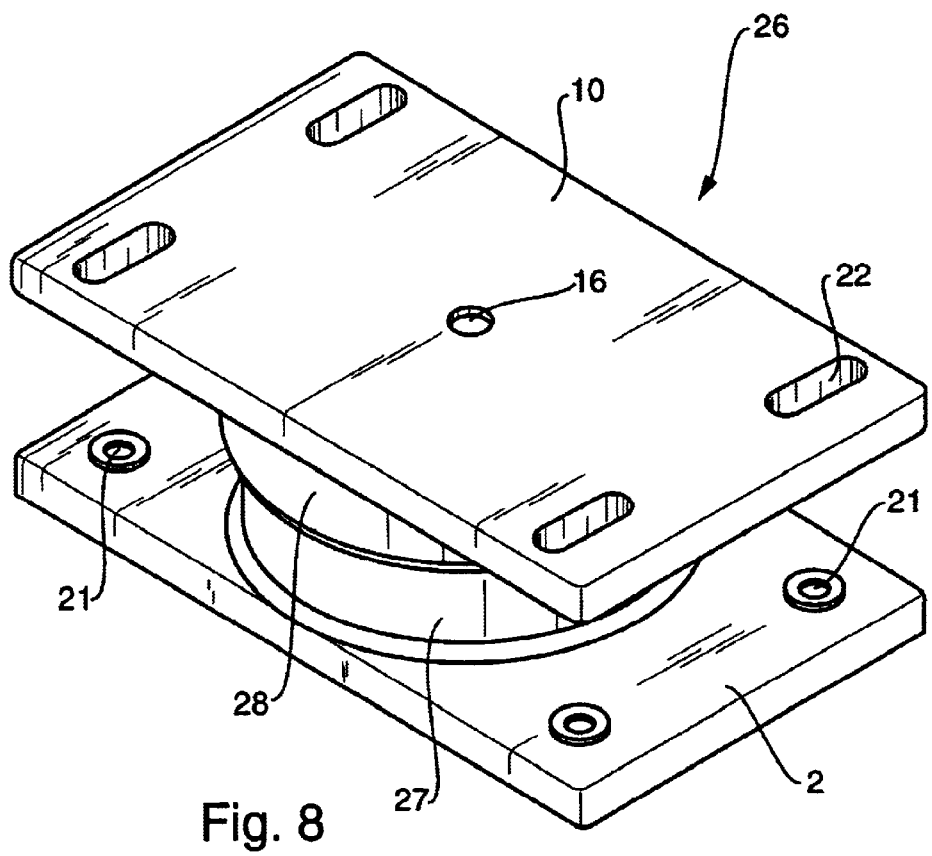
Figure 9:
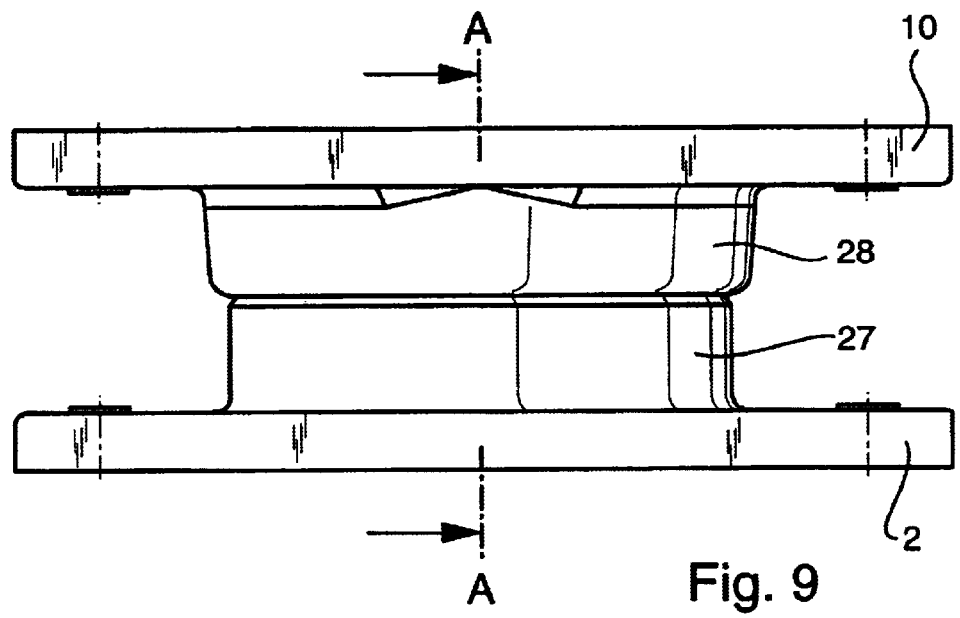
Figure 10:
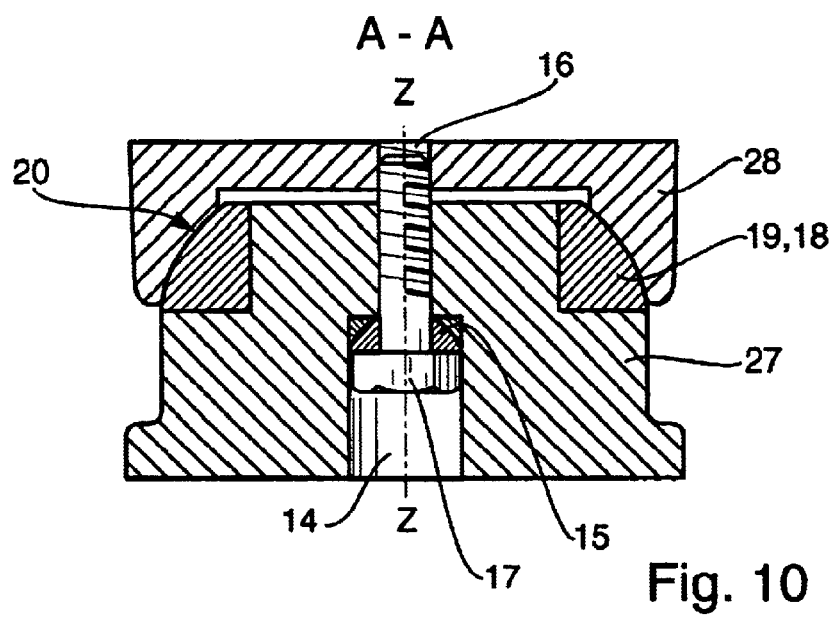
Figure 11:
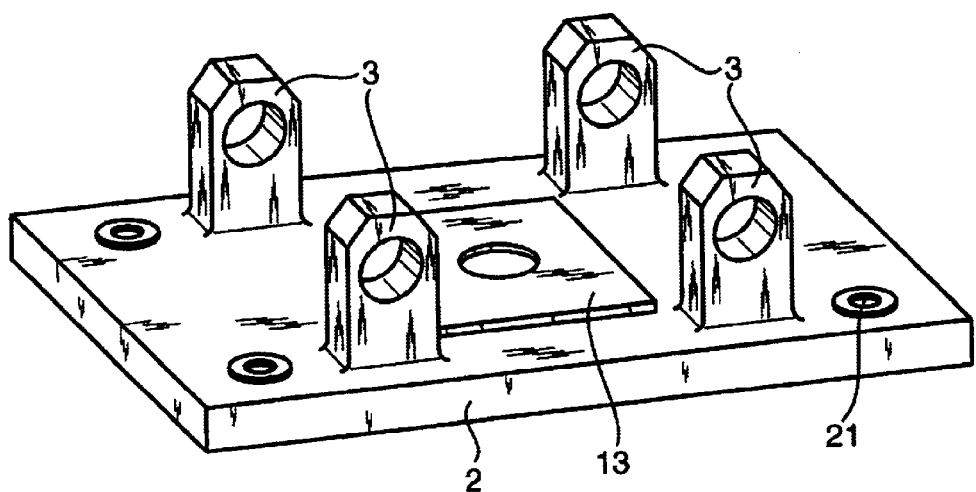
Figure 12:
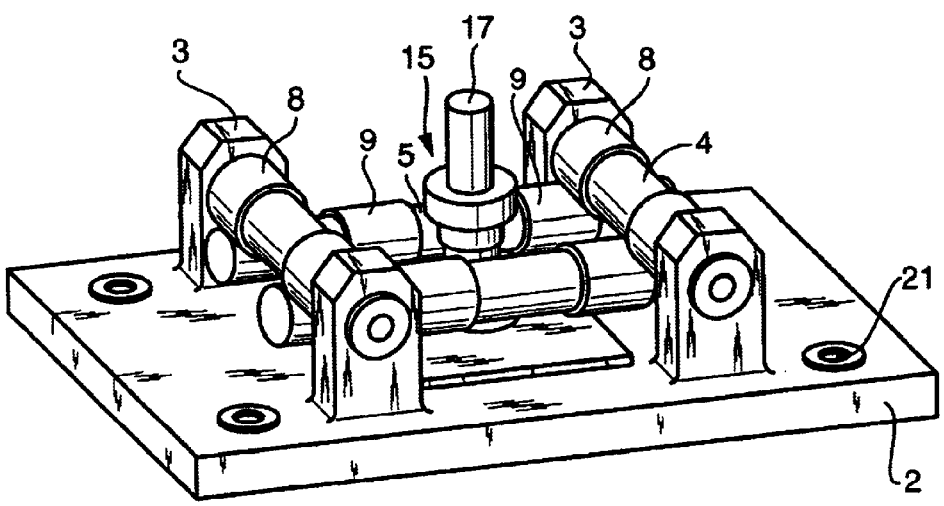

Shown are:

FIG. 1 is a perspective view of an X-, Y-, and Z-bearing according to the invention, FIG. 2 is a front view of this bearing, FIG. 3 is a side view of this bearing, in partial section, FIG. 4 is a section view along the line A—A in FIG. 3, FIG. 5 is a section view along line B—B in FIG. 3, FIG. 6 is a perspective view of an X-, Z-bearing according to the invention, FIG. 7 is a perspective view of a Y-, Z-bearing according to the invention, FIG. 8 is a perspective view of a Z-bearing according to the invention, FIG. 9 is a side view of the bearing according to FIG. 8, FIG. 10 is a section along the line A—A in FIG. 9, FIGS. 11–15 are sequential perspective views of an X-, Y-, Z-bearing according to the invention during different stages of construction.

Figure 16:
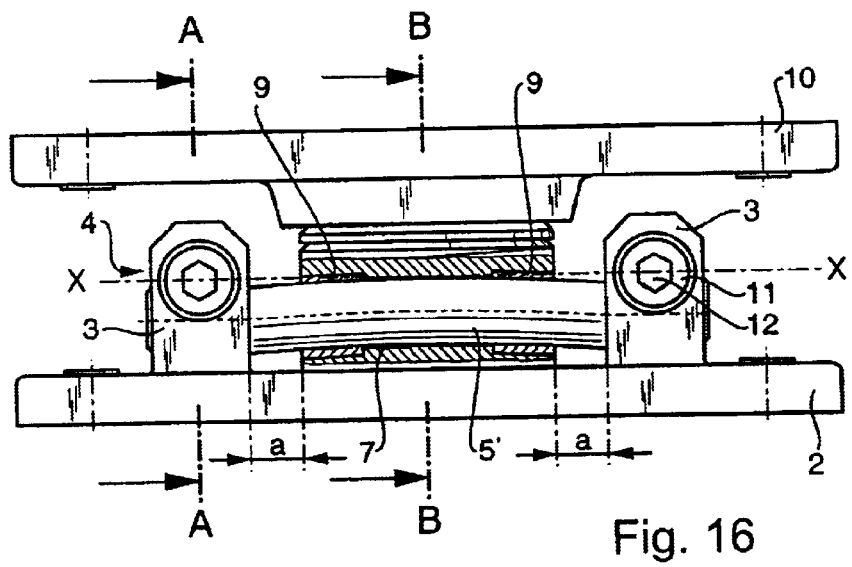

FIG. 16 is a side view similar to FIG. 3, in which the X-shafts have a deflection in the direction of the cover plate.

DETAILED DESCRIPTION OF THE PREFERRED EMBODIMENT(S)

Referring to FIGS. 1 to 5 the X-, Y-, Z-bearing indicated with 1 according to the invention is shown and includes a base plate 2 provided with mounting bore holes 21, on which four shaft holders 3 projecting in the X and Y direction and set apart from each other, are arranged. In these paired shaft holders 3, two Y-shafts 4 are housed, the mounting of which is done by mounting caps 11, which are pressed from the outside against the shaft holders 3 via the mounting bolts 12 that are screwed into the Y-shafts 4. In the Y-direction, between each pair of shaft holders 3, an additional shaft holder 6 is arranged, whereby both shaft holders 6 are connected to each other by two X-shafts 5 which are spaced apart from each other. The intersection of both shafts 4, 5 is made possible by an opposing recess of the X-shaft, as shown in FIG. 4. On the X-shafts 5, a carriage 7 is guided on slide bushings 9. The carriage 7 is connected to a cover plate 10 provided with longitudinal bore holes 22. This carriage 7 can be moved in the X-direction by the amount "a" from a neutral position both to the right and to the left, as shown in FIG. 3. The X-shafts 5 in turn can also be moved in the Y-direction, as shown in FIG. 4, by the amount "b" from a neutral position both to the right and to the left. The movement in the Y-direction is done by using the shaft holder 6 and its slide bushings 8.

As can be ascertained from FIG. 5, the carriage 7 is equipped in its middle part with a through hole 14. On a shoulder 31 of the through hole 14, a pivot bearing 15 rests, which is held with a mounting bolt 17 that is screwed into the through-hole 16 of the cover plate 10. A journal 23 of the carriage 7 is surrounded by a shaft disc 19 of a pivot bearing 18, whereby the shaft disc 19 can be accommodated by a recess 20 in the cover plate 10. In this way, a securement against lift-off is formed, which prevents a lift-off of the cover plate 10 from the carriage 7. A pivoting of the cover plate 10 is only possible in the existing lift-off protection to the extent that the air gap 30, shown in FIG. 5, is provided between the shaft of the mounting bolt 17 and the through-hole 14 allows in the area of the journal 23 of the carriage 7.

As shown further in FIG. 1 and FIG. 5, the base plate 2 is provided with a carrying projection 13 that points in the direction of the cover plate 10, so that between the carriage 7 and the carrying projection 13, there is no gap, i.e. the introduction of forces is done directly on the base plate 2. In this case, it is advantageous to provide the underside of the carriage 7 with a corresponding sliding layer.

If the carrying projection 13 is missing, then a gap is formed between the base plate 2 and the carriage 7, so that introduction of forces is done on the base plate 2 via the X-shafts 5 and the Y-shafts 4.

The X-, Z-bearing shown in perspective in FIG. 6 can, as already expressed by its name, be moved linearly in the direction of the X-axis and can be tilted around the Z-axis. As a result, the Y-shafts 4 are unnecessary, as opposed to the X-, Y-, Z-bearing described above. Otherwise, the bearing structure is mainly the same. This bearing has, furthermore, no mounting securing mechanism, so that the pivot bearing 15 can be omitted.

In FIG. 7, a Y-, Z-bearing is also shown in a perspective form. The design is similar to the X-, Y-, Z-bearing described in FIGS. 1 to 5, whereby because of the two degrees of freedom, the X-shafts 5 can be omitted.

Finally, in the FIGS. 8, 9, and 10, a Z-bearing is shown, which can be swiveled around the Z-axis and inserted as a fixed bearing. As can be seen from the Figures, the base plate 2 is provided with a projection 27 that points in the direction of the cover plate 10, which has on its upper end a shaft disc 19 of a pivot bearing 18. The cover plate 10 in turn is equipped with an opposing projection 28, which is equipped with a ball-shaped recess 20, so that in turn a pivot bearing 18 is formed. This Z-bearing is already equipped in such a way with a mechanism to secure against lift-off in the manner described whereby the projection 27 is provided with a hole 14 that goes through it, which has a shoulder that is not described in greater detail. On this shoulder, a pivot bearing 15 rests, which in turn is held with a mounting bolt 17. Using this mounting bolt 17, the pretensioning of the bearing can be produced.

In FIGS. 11 to 15, an X-, Y-, Z-bearing is shown in perspective in the stages of construction. As can be recognized in FIG. 11, the base plate 2 is provided with mounting holes 21, which function for mounting of a connecting construction. Shaft holders 3 provided with through-holes extend from of the base plate 2. In the middle part of the base plate 2, the carrying projection 13 is visible. As can be recognized from FIG. 12, Y-shafts 4 are received in the reception holes of the shaft holder 3. On these Y-shafts 4, the two slide bushings 8 are arranged. Under the Y-shafts 4 lie two X-shafts 5, which are provided in the area of the slide bushings 8 with a arc-shaped recess, so that the Y-shafts 4 and/or slide bushings 8 partially extends in this recess. In this way, a movement of the X-shafts 5 is prevented. Lying between the X-shafts 5, the pivot bearing 15 with the mounting bolt 17 is indicated.

Figure 13:
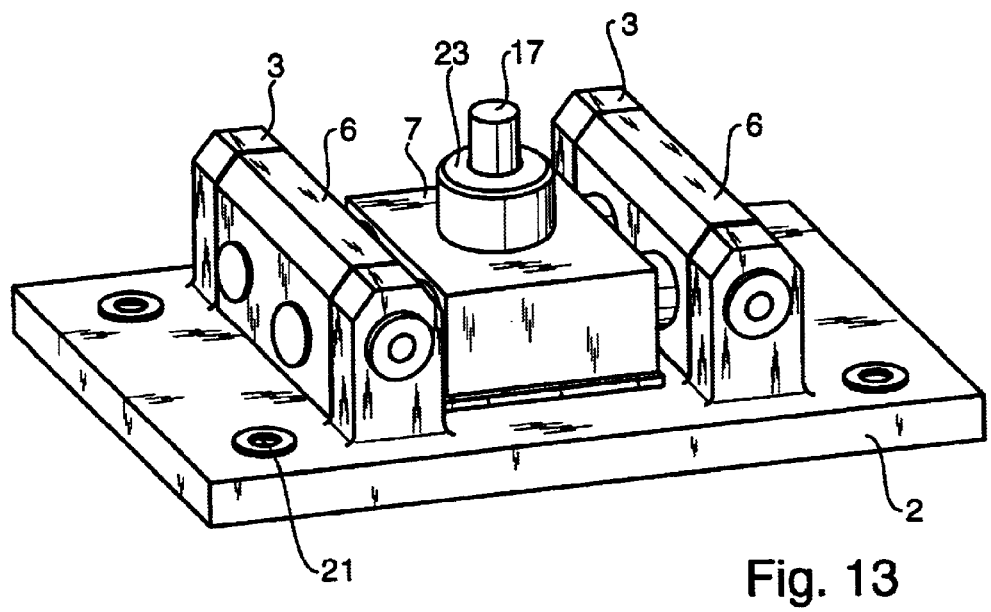
Figure 14:
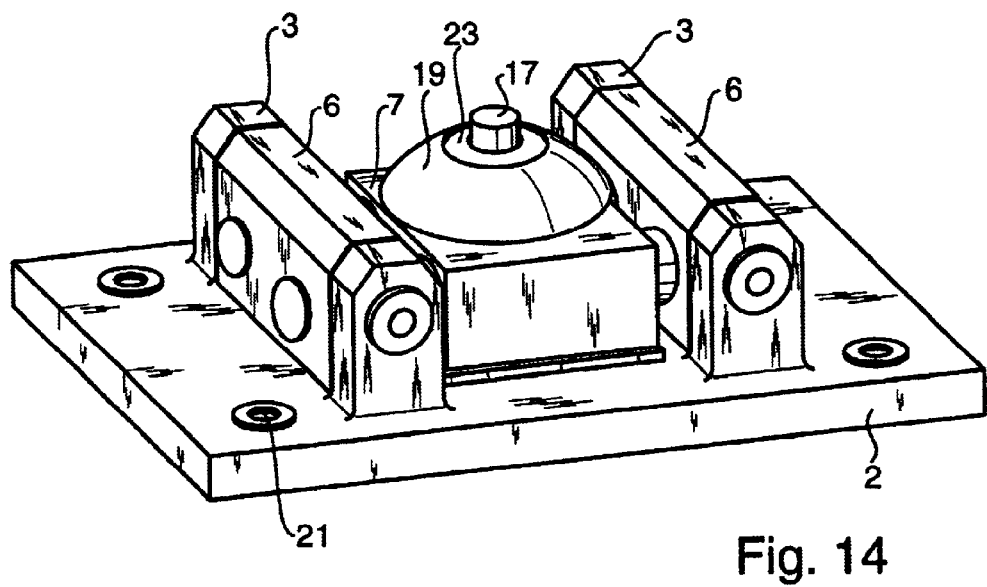
Figure 15:
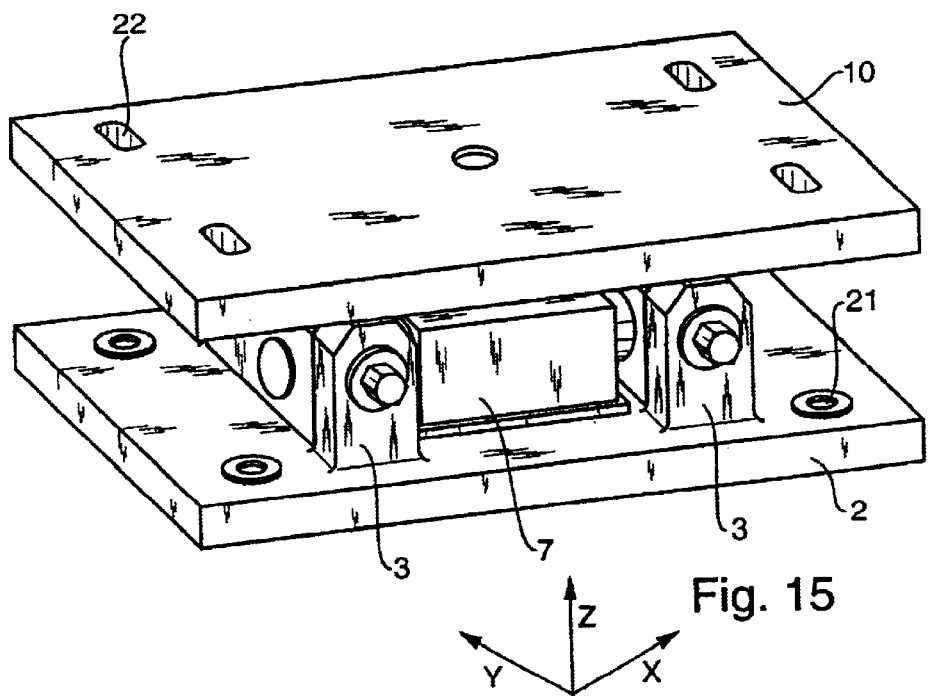

According to FIG. 13, a completion of the X-, Y-, Z-bearing is done in such a way that the X-shafts 5 that carry the shaft holder 6 are shown. On these X-shafts 5, the carriage 7 is shown movably mounted, which carries in its inside the pivot bearing 15 (not shown), whereby the carriage 7 is provided with the journal 23. Also to be recognized is the mounting bolt 17, which is screwed into the cover plate 10 not shown here. As can be recognized from FIG. 14, the bearing is now completed in such a way that a shaft disc 19 of the pivot bearing is placed around the journal 23 of the carriage 7. Finally, in FIG. 15, the bearing completed with the cover plate 10 is shown. It has in its center the through-passage hole 16, in which the mounting bolt 17 is screwed in.

As shown in FIG. 16, the X-shafts 5' can have a deflection in the direction of the cover plate 10, if desired. It is also possible for the Y-shafts to be deflected toward the cover plate 10 in a similar manner.

| 1 | X-, Y-, Z-bearing |
| 2 | Base plate |
| 3 | Shaft holder for Y-shaft |
| 4 | Y-shaft |
| 5 | X-shaft |
| 6 | Shaft holder for X-shaft |
| 7 | Carriage |
| 8 | Slide bushing on the Y-shaft |
| 9 | Slide bushing on the X-shaft |
| 10 | Cover plate |
| 11 | Mounting cap |
| 12 | Mounting bolt |
| 13 | Carrying projection |
| 14 | Through hole |
| 15 | Second pivot bearing |
| 16 | Through hole |
| 17 | Mounting bolt |
| 18 | First pivot bearing |
| 19 | Shaft disc |
| 20 | Recess |
| 21 | Mounting bolt |
| 22 | Longitudinal bore hole |
| 23 | Journal |
| 24 | X-, Z-bearing |
| 25 | Y-, Z-bearing |

-continued

| 26 | Z-bearing |
| 27 | Projection |
| 28 | Opposing projection |
| a | Movement amount in the X-direction |
| b | Movement amount in the Y-direction |

What is claimed is:

1. A bridge bearing adapted to slideably connect a substructure and a superstructure to each other, whereby displacement occurs in a linear and/or cardanic manner in at least one of horizontal X and Y directions and tiltable in a Z direction in a hypothetical three-dimensional coordinate system, the bearing is constructed as an X-, Y-, and Z-bearing comprising a base plate (2) that has four projecting shaft holders (3) that are set apart from each other in which two Y-shafts (4) are held, whereby on each of the Y-shafts (4) an additional shaft holder (6) is movably arranged, the additional shaft holders are connected to each other by two X-shafts (5), and a carriage (7) is guided on the X and Y shafts (5, 6) by slide bushings (9, 8) and can be moved linearly in both the X and Y directions, and the carriage (7) has a curved shaft disc (19) thereon that is received in a complementary recess (20) of a cover plate (10) connected to the carriage so that the cover plate (10) can be tilted in the Z-direction by a first pivot bearing (18) formed by the shaft disc containing the cover plate wherein the Y-shafts (4) are affixed in the projecting shaft holders (3) using mounting caps (11), each of which are pressed against the respective projecting shaft holder (3) with a mounting bolt (12) that is located in facing ends of the Y-shafts (4).

2. The bridge bearing according to claim 1, characterized in that the slide bushings (8, 9) are maintenance-free cylindrical slide bushings formed of Teflon.

3. The bridge bearing according to claim 1, characterized in that the X-shafts (5) each have a curved recess on opposite ends thereof, into which the Y-shafts (4) are set.

4. The bridge bearing according to claim 1, characterized in that the base plate (2) has in a middle part thereof a supporting projection (13) that projects in a direction of the cover plate (10) and is contacted by a lower side of the carriage (7) in an unloaded condition.

5. The bridge bearing according to claim 1, characterized in that the X and/or Y shafts (5, 4) have a deflection in a direction of the cover plate (10).

6. The bridge bearing according to claim 1, characterized in that the carriage (7) has in a middle part thereof a hole (14) extending therethrough that is provided with a shoulder, into which a second pivot bearing (15) is set and is held via a mounting bolt (17) that is inserted into the cover plate (10), whereby in an area of a journal (23) of the carriage (7), a gap is formed between the mounting bolt (17) and the hole (14).

7. The bridge bearing according to claim 6, characterized in that the first and the second pivot bearings (18, 15) have a common spherical center.

8. The bridge bearing according to claim 6, characterized in that first and the second pivot bearings (18, 15) are constructed as maintenance-free axial pivot bearings, radial pivot bearings, or inclined pivot bearings formed of Teflon.

* * * * *